Nov. 21, 1933.　　　E. J. W. RAGSDALE　　　1,935,916
METAL DIE AND METHOD OF MAKING THE SAME
Filed June 6, 1928　　2 Sheets-Sheet 2
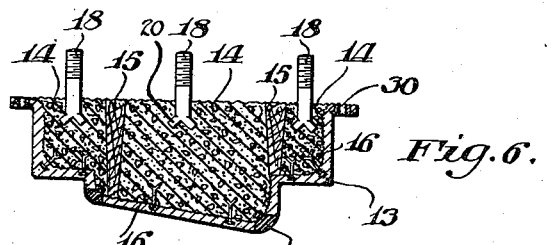
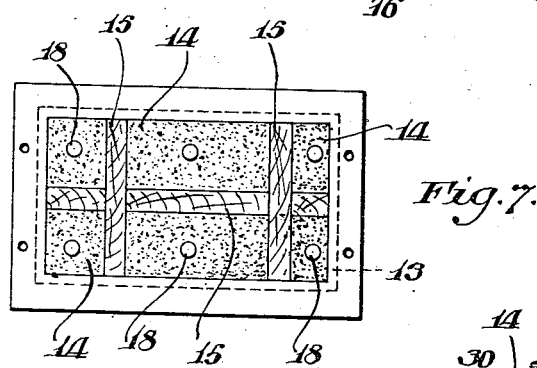
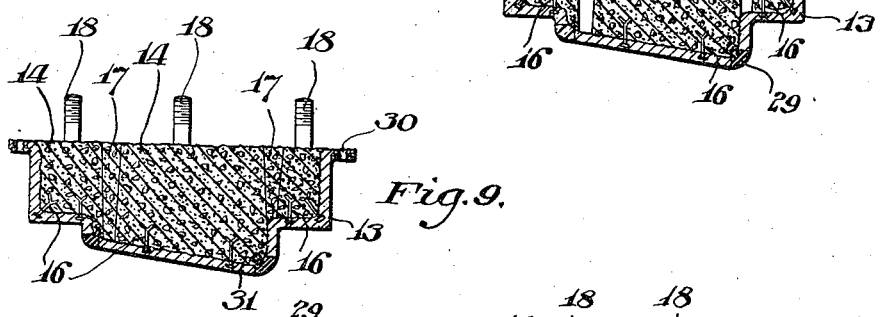
INVENTOR:
Earl J. W. Ragsdale,
BY
ATTORNEY.

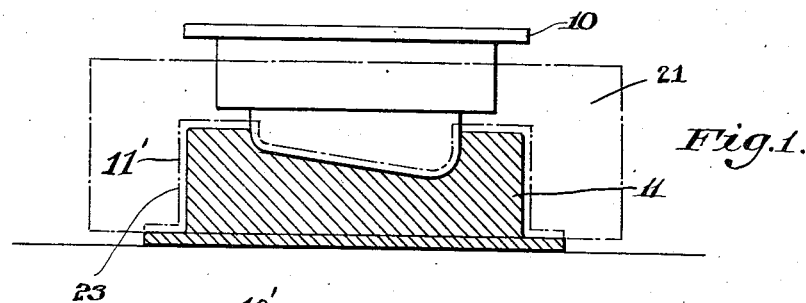
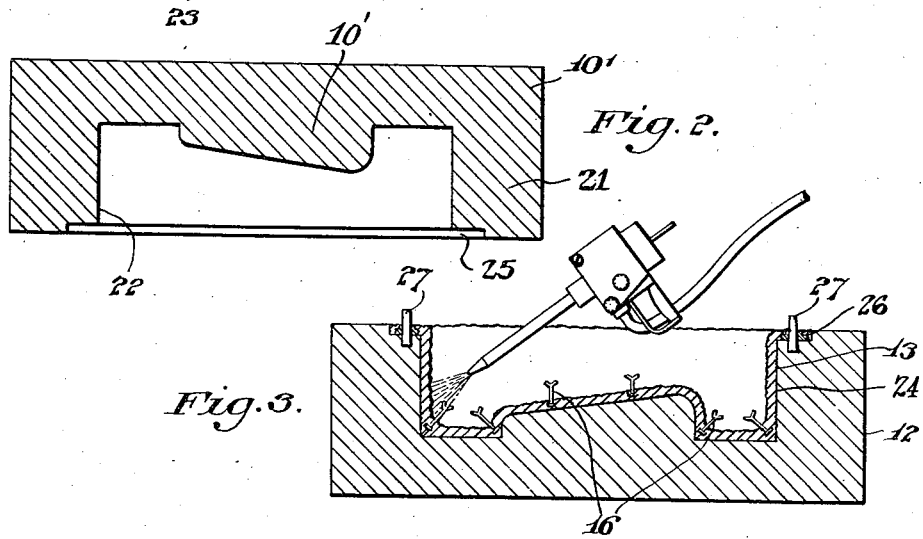
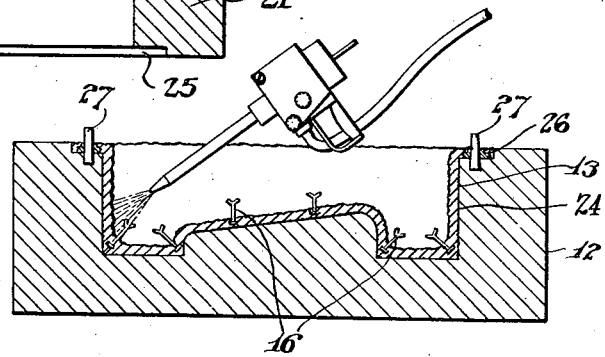
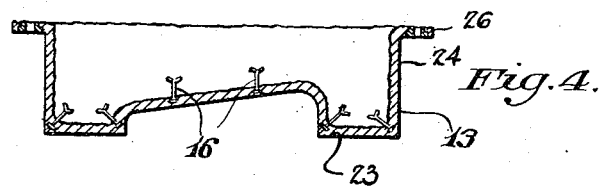
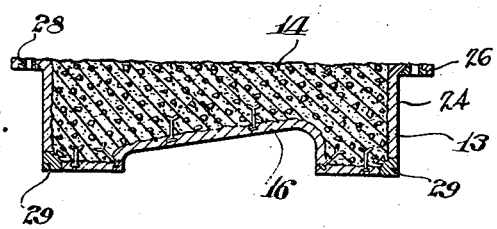

Patented Nov. 21, 1933

1,935,916

UNITED STATES PATENT OFFICE 1,935,916

METAL DIE AND METHOD OF MAKING THE SAME

Earl J. W. Ragsdale, Norristown, Pa., assignor to Edward G. Budd Manufacturing Company, Philadelphia, Pa., a corporation of Pennsylvania Application June 6, 1928. Serial No. 283,319

12 Claims. (Cl. 76—107)

My invention relates to a method of making metal dies. Metal dies of any irregular or complicated shape have always heretofore been inordinately expensive for work of relatively small production. Indeed, in instances of extreme complication and extremely large size, the cost has been prohibitive for all except extremely high production. Indeed, there has been a great middle ground in which the rendering available for production of the extremely efficient die stamping method and sometimes the very making of articles of drawn metal, has been entirely dependent upon the relation of the die cost to the quantity produced. And in more cases than not, in certain classes of products, the die cost has been prohibitive and the products have continued to be manufactured by other methods with continued high cost, high weight and in some cases, mechanically imperfect products.

The prime object of my invention, therefore, is to so reduce the cost of die making at large as to remove altogether, or substantially altogether, the limitations heretofore imposed by the high cost of die making. In other words, my object is to make the metallic dies so cheaply that the manufacturer of every product capable of being made of die drawn material may enjoy the benefits which come from die stamping of sheet metal or the equivalent.

In brief, I attain the objects of my invention by preparing a form of an easily workable material, as for example, wood, plaster of Paris, paraffin, or the like, cover this form with metal by spraying it on in a melted condition by any one of the metal spraying processes now well known, as for example, the Schoop process, thereby forming a shell which will be the exterior shell of the die and thereupon removing the shell so made from the form, and applying to it by molding plastic material to provide a backing of sufficient dimension and mass to give the die the requisite mass and size for mounting and working. Preferably the form which I use is made to represent that part of the die complemental to the part for which the shell is to be formed. Thereby the accuracy of dimension and the smoothness of surface necessary on the working surface of the die is insured, and thereby also the underneath roughness of the deposited metal of the shell becomes available to effect a more efficient and stronger bond with the molded material which is to form the backing. This molded material may be any one of numerous cements, resins, rubbers, or alloys of low melting point, in short, any material whatever which may be molded or cast into its relation to the shell without damaging the shell in the molding or casting operation.

The practice of my invention is illustrated in the accompanying drawings of which—

Figure 1 shows a form of a punch complemental to a die which is to be formed.

Figure 2 shows the punch separate from the die and as made of workable material.

Figure 3 shows the shell in process of formation by the deposit of metal upon the form.

Figure 4 shows the shell removed and ready to receive its backing.

Figure 5 shows the molded or cast backing in place.

Figure 6 is a transverse cross section of a partially complete punching die complemental to the die of Fig. 5 and formed by similar process but showing additional features of my method.

Figure 7 is a top plan view of the partially completed die of Fig. 6.

Figure 8 is a transverse cross section showing intermediate partitions removed from the sectional backing according to a further step of my invention.

Figure 9 shows the space formerly occupied by the partitions filled with the backing material according to the next step.

Figure 10 is a similar view showing the top surface smoothed by the application of a surfacing material.

Examining these drawings now more particularly, 10 is the punch. 11 is the die which is to be formed. This punch I duplicate with a wood, plaster or other workable material designated 10' in Fig. 2. It is a well known fact that molten metal deposited according to the Schoop or other similar process does not ordinarily penetrate such workable materials except under inordinate pressure. The pressure may be easily controlled within such limits as will insure deposit with a smooth and uniform surface of deposit corresponding precisely to the pre-finished surface of the form. This form is mounted on a suitable stand for work as for example, 12, and with a so-called metal spraying "gun," the metal is sprayed at the rate which good practice in the spraying of metal dictates, as for example, 1/1000 of an inch per traverse per unit area of the surface to be coated. The size of the gun or the number of guns may be varied to meet the rate at which it is desired to do the work. One skilled in the deposit of such metals can control the uniformity of the deposit with considerable accuracy. It is intended that the deposit will be so thick as desired, relatively thin in connection with small dies and relatively thicker in connection with larger dies, thicknesses of from ⅛ to 1 inch being contemplated in connection with the circumstances, sometimes even greater.

So too, the particular metal used for the spray may be varied, iron, nickel, steel, copper, brass and various alloys, nickel and chromium for example. Also all metals which have been previously pulverized may be utilized in addition to those which are manufactured in drawn wire form as commonly utilized in the Schoop guns.

The shell 13 so made is then removed from the form. The form in some instances may be directly removable. In other instances it may be a collapsible one. In the form collapsed it is, of course, deformed. All the artifices known to the pattern makers' art may be called into play depending upon the nature of the die being manufactured. The shell so removed I place in suitable position and if necessary apply suitable boxes to receive and confine the molded or cast material of the backing. This material is designated 14. It may be applied by any of the devices known to the art for such application, the application being made in bulk all at one time, or by parts and sections combined together as known in these arts. Preferably such materials are used for this backing as to render the completed product free from defects due to undue expansion and contraction during setting or subsequent to setting. The number of alloys of low melting point known to the art are so varied and so great as not to need specific mention here. So also the number of plastic compounds which may be applied either hot or cold in one condition or another are so great as not to need specific mention here. Upon setting or hardening of the backing the boxing, if used, is removed and the product is ready for use in the die press provided only that the dimensions have been maintained with sufficient accuracy.

There are many refinements of my method to the end of strengthening the product, prolonging its life, rendering it the more accurate, and the more immediately ready for use. One of the principal ones I show in Figs. 6 to 10. The backing 14 in Fig. 6 is applied in a plurality of sections spaced apart a fraction of an inch by wooden partitions 15 or their equivalent which are so formed as to be readily removed after the backing has set or hardened, (Figs. 6 and 7). The wooden partitions are, of course, more elastic than the metal or concrete backing and are expansible and contractible to a higher degree. In other words, they give in response to the contracting and expansion of the backing. Partitions 15 may be convergent toward the shell 13. Each section of the backing 14 is anchored to the continuous shell not only by the roughness of the interior of the shell, but also by anchors 16 in the form of wires or bolts or rods, the ends of which are embedded and perhaps autogenously joined in the shell during the step of depositing. The embedded ends may be provided with heads as shown or any other means to improve the anchorage and joinder to the shell. Upon being surrounded by the backing material, they irremovably anchor the backing to the shell. After the backing has been deposited in sections spaced by the partitions and set or hardened, the partitions are removed (Fig. 8) and the spaces formerly occupied by them are filled with the same backing material or some other backing material which may for some special reason be found the more suitable. Such a final product in which the spaces have been filled by a backing material 17 is shown in Fig. 9.

The result of these added steps of the process have been great improvements in the bond between the shell and the backing 14 and an entire elimination of any adverse accumulated effects of expansion and contraction, for each section sets or hardens independent of each other section affecting mainly only the spaces between the sections and the relatively soft partitions 15 which are subsequently removed. The filling material 17 of the spaces between the sections being relatively thin when it sets and hardens does not expand or contract to such extent as to have any adverse effect.

In Figs. 6–10 the completed die is shown furnished by bolts 18 for mounting it upon a die carrying head. These bolts 18, according to a further step of my invention, are anchored in the backing 14 at the time the backing is molded or cast in place. This is readily accomplished by their suspension in proper position through a proper template or other form. Still further, extending over all the sections of the backing 14 in common and bonded thereto through its irregular under-surface and anchors 20 is a backing plate 21 of easily workable material, as for example, babbitt or the like, which can be readily machined or otherwise worked to the accurate dimension and plane form commonly required for attachment to die carrying heads. The under-surface of this plate 21 conforms to the irregularities of preparation of the under surface of the completed die. It may be molded or cast over the top surface of the completed backing. If, of course, the backing itself is formed of such material, the intervening plate may not be necessary. But it will be especially useful in those cases where the backing is of a cement rather than of cast material.

The range of utility of my invention is very, very great. The degree of its adaptability is extremely high. There is no phase of it but which is readily adaptable by skill and ingenuity to the many ramifications of the die makers' art. Accordingly, the number of modifications and improvements will be unusually high. It follows that it is very difficult to express perfectly in the claims the generic spirit of my invention and the statement which I now make that all such modifications and improvements are to be comprehended within the scope of the annexed claims is to be given unusual weight.

Many modifications and improvements are already known to me. As a part of my original invention I have conceived that the shell receiving surface of the form which receives the deposit may be provided initially with a protecting coating which serves two purposes, first the facilitating of the removal of the shell by preventing undue adherence, and second, the protection of the surface from heat of the deposit, in some cases where the deposit is made at the higher temperatures. The coating may serve either or both of these functions. A coating of graphite, carbon black, or the like, or bees-wax will serve either or both of these purposes. The material in the coating may be applied in amorphous form or in liquid form or otherwise, perhaps even in sheet form.

In instances where the temperature of application is high, I may construct the form of heat resisting friable material, which, while it may unduly adhere to the shell form, it may be easily broken up. So too, I may arrange for cooling of the interior of the form to prevent sustained heat over any given heat area.

The shells themselves may be reinforced in various ways. For example, I contemplate in connection with the present invention having the shell not only of the extent of the working surface of the die but of the entire surface extent of the die. Thus, the shell 13, as shown in Figs. 3 to 5, I extend all the way up to the bed plate or die carrying head of the press. This is accomplished by supplementing the form 10' by a construction 21 complemental to the dotted line portion of the die 11' to be formed. This provides the surface 22 for deposit corresponding to the outer surface 23 of the die 11. The deposit 13 of the shell is then extended all the way around not only the portion 10' of the form but the portion 21 with the result that the outer portions 24 of the shell surround and embrace the inner portion, and when the backing material 14 is put in place, surround, embrace and bond that backing material as by a band of metal. Such an all embracing shell so reinforces the backing material as to greatly increase its resistance to crushing or displacement and many times multiplies its strength.

Furthermore, I recess as at 25 the margins of the embracing portions 21 of the form at a sufficient depth to enable me to form extensions 26 of the shell 13 of the shape of perimetral flanges. Dowels 27 are appropriately mounted and tapered and enable bolt holes to be formed in these flanges during the deposit and the flanges additionally reinforce the borders of the shell and prevent rupture thereof under internal strains of the backing. They constitute a means for securing the flange directly to the bed plate of the press by bolts passed through the holes as shown in Fig. 10.

Still further, sharp corners of the shell may be reinforced by extra thicknesses of metal deposited in the corners as appearing in all figures showing the shell. Moreover, suitable bracing ribs in a plane at right angles to the body of the die or at any suitable angle to any surface or portion to be pressed may be formed either internally or externally of the die by provision of suitable building up slots and walls within the form 21 or within the body of the shell being formed as occasion may require. These may or may not be combined with the anchorages 16 through which the shell is bonded to the backing. Mounted in place the shell may be still further reinforced against internal and external stresses by having the bed plate provided with abutments which embrace the edges of the reinforcing flange 26. Bolt or screw holes 30 are provided in the reinforcing flange through which the die is secured to the bed plate or plunger of a press.

The shell may be reinforced against wear by hardened steel inserts at the points of greatest wear as for example, inserts 28, 29 shown in Figs. 5, 6 and 8 to 10. These inserts will take the exterior form of the particular surface of greatest wear and will have their exterior surfaces finished to working dimensions. They will be mounted on the form initially by bolting, screwing or otherwise securing them in place, such bolt or screw holes being (not shown) and the screws being projected thereinto from the interior of the form. The inner or shell receiving surfaces 31 of these inserts are rabbeted, recessed, serrated or otherwise configured to mechanically interlock with the shell walls, deposited about them and with the backing material which may or may not engage with their extreme inner portions. So too, the anchorages 16 and 20 may connect directly with them. The sprayed metal may be termed agglomerated metal and the inserts may be termed non-agglomerated metal.

The method of deposit of the shell may be greatly varied without departing from the spirit of my invention although invention may be involved in the variation itself. Thus, my present invention contemplates that the initial deposit may be made at relatively low temperature and pressure or either of them with a view to preventing undue penetration of the initial deposit or undue heat effects if the temperature of the deposit at large is to be high for the initial deposit of the first layer or two, that is to say, the first application or two of the metal spray, will protect the receiving surface of the form against high pressure and high heat of subsequent application. So too, I may vary the material of the initial deposit of the spray as against the material of the later deposit of the spray, the material of the deposit being chosen with especial reference not only to the protection of the receiving surface of the form but also with a view to the improvement in the working and wearing characteristics of the shell when completed. Thus, the initial deposit may be a deposit of copper at relatively low pressure and temperature and the subsequent deposit of iron. This makes for better working qualities for the completed die, lubricating the die as it is used. Thus, also, the initial deposit may be of nickel or chromium or combinations of these with steel so as to make the extreme outer surface of the shell of higher resistance to wear. Any of these exterior surfaces may be renewed after the die has been used for a considerable period of time.

The deposits subsequent to the initial deposit I contemplate will be made of such material as will give the shell the physical properties known to be most desired in dyes, plus the physical properties known by me and subsequently to be found most desirable in furthering the strength and durability of the shell and its coaction and interfunctioning with the backing to the joint end of securing perfect harmony of inter-support between the shell and the backing and enabling me to utilize the most economically applied backings available.

I prefer to build up the shells 13 at such temperature as will enable me to secure not only the most perfect mechanical bond between the impacting particles but also so large an amount of autogenous joinder between the particles as may be obtained with the highest usable temperature possible. The highest usable temperature and the largest possible size of the impacted particles of the sprayed metal will determine these factors. If the projecting particles reach the surface of deposit at welding temperature, they will become autogenously joined to each other. This temperature may be adjusted so that under the mechanical impact they are welded together.

The backing 14, instead of being of cementitious material, may as aforesaid be of any suitable form of cast material. With a shell of suitable material and thickness the backing may be of cast iron, the more especially in the instance where, by means of partitions 15, the backing is initially cast in divided sections. In this instance the partitions 15 will be cores of sand capable of resisting the high heat of the molten cast iron. The cores 15 will then be broken out and filled with additional cast iron or other suitable cast metal filling.

My invention is susceptible of many modifications without departing from its generic spirit as will be easily perceived and such modifications I claim as well as the modifications disclosed and outlined.

What I claim is:

1. The method of making metal forming dies which consists in making a form complemental to the die having a surface complemental to the working surface of the die to be made, removably depositing thereon by metal spray a metallic shell, removing the shell from the form, and anchoring to the shell bonds to extend between the shell and the backing during the step of depositing the shell.

2. The method of making dies which consists in making a form of a surface configuration complemental to the die it is desired to make, removably forming on said complemental surface a shell, removing the shell from the form, applying a backing thereto on the surface opposite to that contacted with the form, and anchoring mounting means to the backing during the process of applying the backing.

3. The method of making dies which consists in making a form of a surface configuration complemental to the die it is desired to make, removably forming on said complemental surface a shell, removing the shell from the form applying a backing to the reverse side of the shell in sections spaced apart by compressible and expansible material, removing the spacers and thereafter filling the space previously occupied by them with additional backing material.

4. As an article of manufacture, a die comprising an exterior working surface constituted by a spray deposited metal shell and a backing therefor, and metallic bonds autogenously joined to the shell and secured in the backing.

5. As an article of manufacture, a die comprising a working surface constituted by a shell of agglomerated metal and a wearing portion of compacted non-agglomerated metal embedded in the agglomerated metal of said surface.

6. The method of making dies which consists in providing a form complemental to the working face of the die desired, removably depositing thereover metallic spray at a relatively low temperature to avoid damaging the form therewith, thereupon depositing a further metallic spray at a relatively high temperature and to a sufficient extent to constitute a shell of self-sustaining form, and thereafter removing the shell from the complemental form.

7. As an article of manufacture, a die, the exterior of which is constituted by a hollow shell of spray deposited metal having integral reinforced portions of the same metal in the margins thereof.

8. Method of making dies which consists in providing a form corresponding to the working face of the die desired, securing to said form prefabricated wearing parts for the die to be formed, and thereafter depositing on said form and about the wearing portion of the die a metallic shell adapted to constitute the exterior of the die and its surface adjoining the wearing portion, by means of a molten metal spray.

9. As an article of manufacture, a die comprising a working surface constituted by a shell of agglomerated metal, a filling for the shell, and a wearing portion of non-agglomerated metal embedded both in the agglomerated metal and the filling.

10. A die having its exterior working contour walls of spray deposited metal, a backing of molded material, and a backing face of cast material.

11. A die having its exterior working contour walls of spray deposited metal, a backing of molded material, and a backing face of cast material, anchoring means for the die connecting in some part with the contour wall and in some part with the backing of the die.

12. The method of making dies which consists in making a form of a surface configuration complemental to the die it is desired to make, removably forming on said complemental surface a hollow shell, removing the shell from the form, filling the hollow portion of the shell with a principal backing of flowable material adapted to harden subsequently and then applying a supplementary backing of easily machined material to the rear of the principal backing.

EARL J. W. RAGSDALE.